Patented Mar. 31, 1936

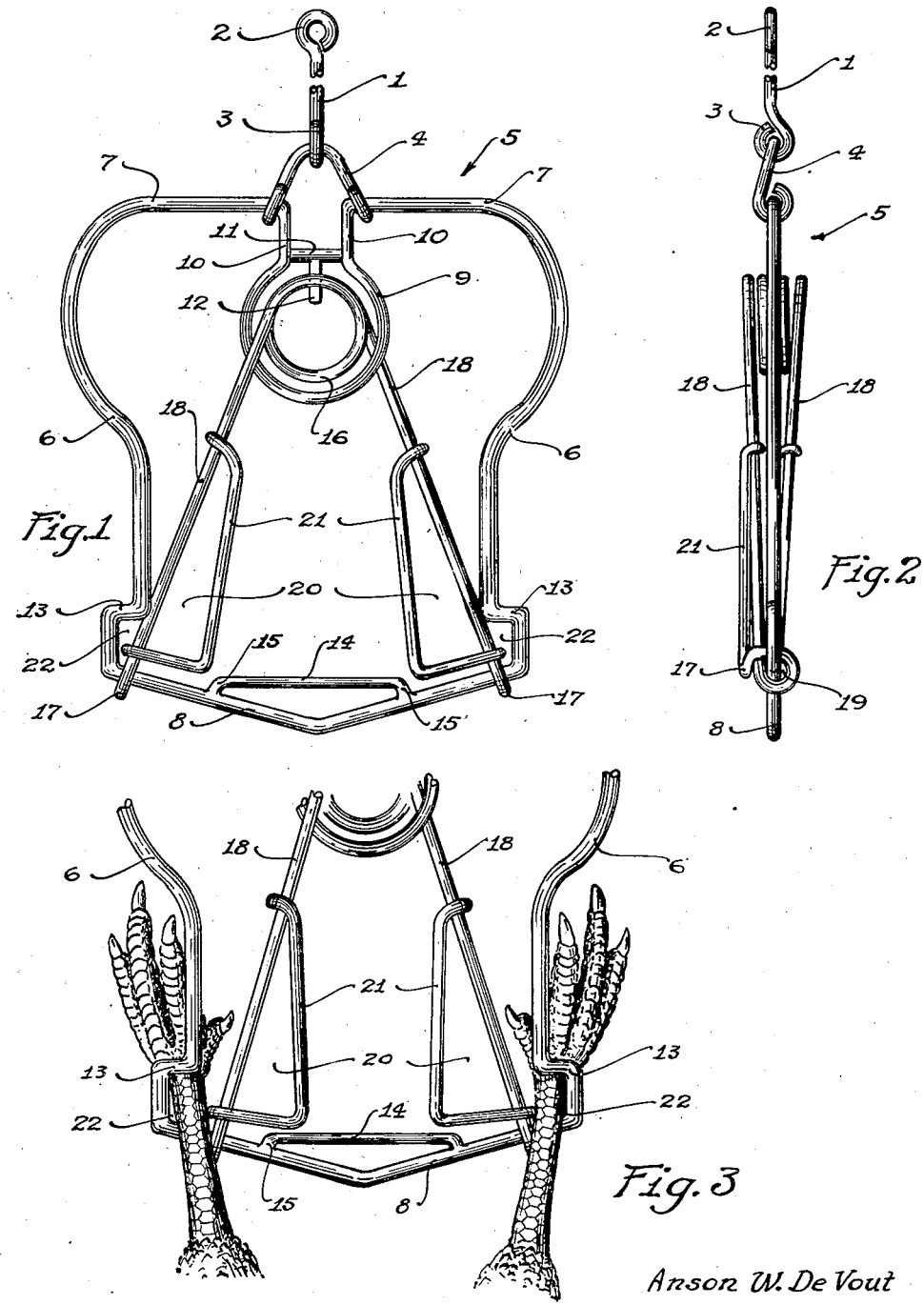

2,035,948

UNITED STATES PATENT OFFICE 2,035,948

POULTRY SHACKLE

Anson W. De Vout, La Grange, Ill., assignor to Industrial Patents Corporation, Chicago, Ill., a corporation of Delaware Original application January 27, 1932, Serial No. 589,224. Divided and this application November 2, 1932, Serial No. 640,767

5 Claims. (Cl. 17—44)

This invention relates to a poultry shackle which is particularly adaptable for holding poultry suspended by the legs for slaughtering, picking, singeing and the like.

This application is a division of my application entitled Singeing method and means, Serial Number 589,224, filed January 27, 1932.

It is an object of this invention to provide a simple, practical and efficient poultry shackle which is strong, durable and comparatively inexpensive, and adapted to be used with any desired type of slaughtering, scalding, picking or singeing equipment.

Referring now to the drawing:

Figure 1 is a front view of a preferred embodiment of this invention;

Figure 2 is a side view of the device shown in Figure 1;

Figure 3 shows the manner in which the legs of the poultry are held by the shackle.

The shackle may be suspended from an overhead conveyor by means of a hanger rod 1 which is provided at its upper and lower ends with eyes 2 and 3. The eye 2 is adapted to be attached to the overhead support and the eye 3 is adapted to be linked into the bail member 4 of the shackle frame 5. The shackle frame which is suspended from the hanger rod 1 is composed of spaced sides 6, a top connecting portion 7 and a bottom connecting portion 8. The sides are bowed outwardly at their upper portions and the top connecting portion is provided at the center with an open pendant 9 preferably formed integral with the frame and consisting of a circular portion open at the top and connected with the top of the frame by spaced portions 10 connected at the top of the circular portion or ring of the pendant 9 by a cross piece 11 having a lug 12 depending within the circular portion or ring 9 of the pendant.

The bottom connecting portion 8 is approximately V-shaped and has inclined side portions extending upwardly and laterally from the center of the bottom to the lower ends of the sides 6 which are bowed downwardly or offset at their lower ends at 13 adjacent the terminals of the bottom connecting portion 8.

The approximately V-shaped bottom connecting portion 8 cooperates with a central straight cross piece 14 located above the center of the bottom cross piece and having its terminals secured to the said bottom cross piece approximately midway between the center of the bottom frame and the ends thereof, said terminals forming shoulder 15. The resilient shackle member consists of a spring having a coil 16 located at the top of the shackle member which is also provided with straight downwardly diverging sides slidably connected at their lower ends 17 with the bottom connecting portion 8 of the shackle frame. The sides of the resilient shackle member 18 are preferably provided at their lower ends with eyes 19 to receive the bottom portion of the frame and the lower portions of the sides of the resilient shackle member 18 are provided with upwardly tapered openings 20 formed by approximately L-shaped pieces 21 which may be manually gripped and pressed inwardly to permit the reception of the legs of the poultry in recesses 22 formed by the lower ends 13 of sides 6 and the adjacent portion of resilient shackle member 18, pieces 21 being secured at their terminals to the sides of the resilient shackle member 18. The long arms of the L-shaped pieces 21 extend longitudinally of the sides of the resilient shackle member at an angle to the same to form the tapered openings 20 at the bottom thereof.

The openings 20, therefore, provide handles whereby both resilient shackle members 18 may be simultaneously or successively operated as desired by one hand of the operator, while the operator is adjusting the legs of the poultry with the free hand. It will be noted that the handles are positioned so as to eliminate tangling of shackles, there being no free ends or hooks. Shoulders 15 prevent interference between the handles by acting as stops for ends 17 of resilient shackle members 18, and thus tend to steady the entire device in the hand.

When it is desired to remove the legs of the poultry from the shackle, the sides of the resilient shackle member may be readily moved inwardly to permit withdrawal of the legs of the poultry from recesses 22 without bruising or otherwise injuring the legs of the poultry.

What is claimed is:

1. A shackle comprising a frame, having side members and a lower member, provided at the bottom of said side members with leg receiving recesses, and a yieldable shackle member having sides automatically movable outwardly, said yieldable shackle member being adapted to maintain the poultry legs in the recesses of the shackle frame, said yieldable shackle member being provided with handles within the frame, and being slidable upon the lower member of the frame, said lower member being provided with stops to limit such sliding motion.

2. A shackle comprising an open frame having spaced sides and connecting top and bottom portions and provided at the bottom with a transverse opening having constricted end portions, a yieldable shackle member consisting of a spring coil mounted on the frame at the upper portion thereof, and downwardly diverging sides extending from the coil and slidable on the lower portion of the frame, said sides forming leg receiving openings with said frame and automatically movable outwardly laterally of the frame.

3. A poultry shackle comprising a frame composed of wire bent to form top, side and bottom portions, shackle members arranged wholly between the sides of said frame, and means to urge said shackle members against said sides.

4. A shackle comprising a frame, having side members and a lower member, provided at the bottom of said side members with leg receiving recesses, and a yieldable shackle member having sides automatically movable outwardly, said yieldable shackle member being adapted to maintain the poultry legs in the recesses of the shackle frame, said yieldable shackle member being provided with handles within the frame, and being slidable upon the lower member of the frame.

5. A shackle comprising a frame provided at the bottom with leg receiving recesses, and spring urged shackle members adapted to hold legs in said recesses, said shackle members being so positioned as to remain wholly between the sides of said frame.

ANSON W. DE VOUT.